US010258194B2

(12) United States Patent
Patel et al.

(10) Patent No.: US 10,258,194 B2
(45) Date of Patent: Apr. 16, 2019

(54) CONVEYOR-TYPE GRILLING APPLIANCE FOR COOKING OR RE-THERMALIZING FOOD WITH MULTIPLE INDEPENDENTLY CONTROLLED SETS OF CONVEYORS DEFINING MULTIPLE INDEPENDENTLY CONTROLLED COOKING LANES

(71) Applicants: Dipan Patel, Hoffman Estate, IL (US); Bhupendra R. Patel, Carol Stream, IL (US); Jignesh Patel, Bartlett, IL (US); James R. Buchler, Orland Park, IL (US); Francisco Vega, Chicago, IL (US); Ignacio Vega, Countryside, IL (US); Cheryl L. Panasik, Elburn, IL (US); Robert Lewis Cucchi, Medinah, IL (US)

(72) Inventors: Dipan Patel, Hoffman Estate, IL (US); Bhupendra R. Patel, Carol Stream, IL (US); Jignesh Patel, Bartlett, IL (US); James R. Buchler, Orland Park, IL (US); Francisco Vega, Chicago, IL (US); Ignacio Vega, Countryside, IL (US); Cheryl L. Panasik, Elburn, IL (US); Robert Lewis Cucchi, Medinah, IL (US)

(73) Assignee: A.J. ANTUNES & CO., Carol Stream, IL (US)

( * ) Notice: Subject to any disclaimer, the term of this patent is extended or adjusted under 35 U.S.C. 154(b) by 460 days.

(21) Appl. No.: 15/267,180

(22) Filed: Sep. 16, 2016

(65) Prior Publication Data

US 2017/0099987 A1 Apr. 13, 2017

Related U.S. Application Data

(60) Provisional application No. 62/240,553, filed on Oct. 13, 2015.

(51) Int. Cl.
*A21B 1/48* (2006.01)
*A21B 1/46* (2006.01)
(Continued)

(52) U.S. Cl.
CPC ............... *A47J 37/045* (2013.01); *A21B 1/48* (2013.01); *A47J 37/06* (2013.01)

(58) Field of Classification Search
CPC ... A21B 1/42–1/48; A21B 1/50; A47J 37/044; A47J 37/045
See application file for complete search history.

(56) References Cited

U.S. PATENT DOCUMENTS 3,456,578 A * 7/1969 Pinsly .................. A47J 37/044 118/17
4,421,015 A * 12/1983 Masters .................. A21B 2/00 426/243
(Continued)

*Primary Examiner* — Michael A Laflame, Jr.
(74) *Attorney, Agent, or Firm* — Law Offices of Steven W. Weinrieb

(57) ABSTRACT

A grilling appliance is disclosed for preparing various different types of food wherein the food is conveyed through the appliance, from a food insert end of the appliance to a food removal end of the appliance, by means of continuously movable flow-through upper and lower cooperating conveyors operatively associated with platen-type heating members over which the upper and lower conveyors are conveyed so as to be heated by the platen-type heating members and thereby, in turn, heat, brown, or carmelize the food as desired or required. Multiple independently controlled conveyor sets define multiple independently controlled conveyor cooking lanes within the appliance.

17 Claims, 8 Drawing Sheets

(51) Int. Cl.

| | |
|---|---|
| ***A21B 1/44*** | (2006.01) |
| ***A21B 1/42*** | (2006.01) |
| ***A47J 37/04*** | (2006.01) |
| ***A47J 37/06*** | (2006.01) |

(56) References Cited

U.S. PATENT DOCUMENTS

| | | | | |
|---|---|---|---|---|
| 4,441,003 | A * | 4/1984 | Eves, II | A21B 1/48 198/570 |
| 6,201,218 | B1 * | 3/2001 | Chandler | A47J 37/044 198/586 |
| 7,335,859 | B2 * | 2/2008 | Nevarez | A47J 37/044 219/386 |
| 2005/0115418 | A1 * | 6/2005 | Sands | A47J 37/044 99/423 |
| 2005/0155495 | A1 * | 7/2005 | Nevarez | A47J 37/044 99/385 |
| 2011/0303101 | A1 * | 12/2011 | Fan | A47J 37/045 99/443 C |
| 2013/0306616 | A1 * | 11/2013 | Wildebush | A47J 37/0857 219/413 |

* cited by examiner

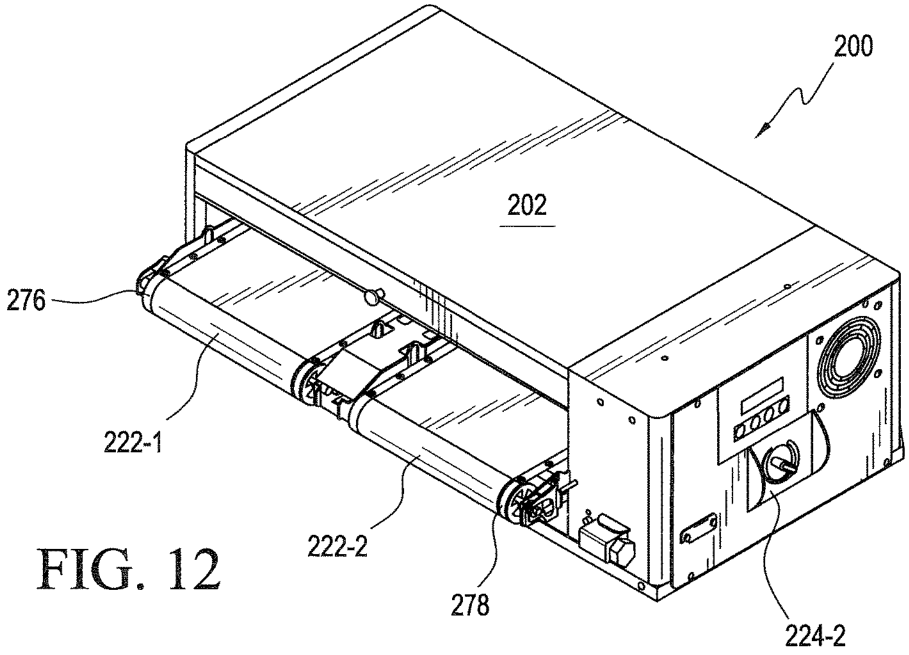
FIG. 12
FIG. 13
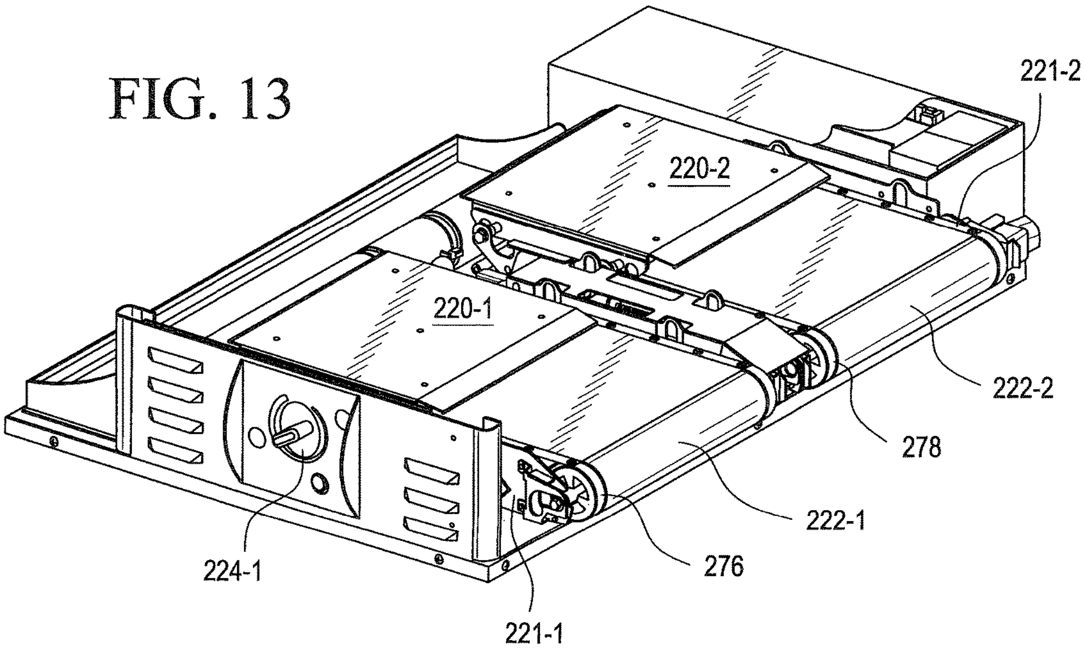

CONVEYOR-TYPE GRILLING APPLIANCE FOR COOKING OR RE-THERMALIZING FOOD WITH MULTIPLE INDEPENDENTLY CONTROLLED SETS OF CONVEYORS DEFINING MULTIPLE INDEPENDENTLY CONTROLLED COOKING LANES

CROSS-REFERENCE TO RELATED APPLICATION

This patent application is a non-provisional patent application conversion of U.S. Provisional Patent Application Ser. No. 62/240,553 which was filed on Oct. 13, 2015, the priority benefits of which are hereby claimed.

FIELD OF THE INVENTION

The present invention relates generally to food preparation apparatus, equipment, or appliances, and more particularly to a grilling appliance for preparing various different types of food wherein the food is conveyed through the appliance, from a food insert end of the appliance to a food removal end of the appliance, by means of continuously movable flow-through upper and lower cooperating conveyors operatively associated with platen-type heating members over which the upper and lower conveyors are conveyed so as to be heated by the platen-type heating members and thereby, in turn, heat, brown, or carmelize the food as desired or required. Multiple independently controlled conveyors, for defining multiple independently controlled conveyor cooking lanes, are also provided so as to permit the appliance to simultaneously cook or re-thermalize different foods at different temperatures and cooking speeds.

BACKGROUND OF THE INVENTION

In the food preparation industry, particularly within the fast-food industry, various types of apparatus, equipment, or appliances are utilized to cook or prepare various different types of food such as, for example, burritos, Panini sandwiches, crunch wraps, and the like. The apparatus, equipment, or appliances that are conventionally employed are either flat grills which effectively cook or toast one side of the food, and then they cook or toast the other side of the food when the food is flipped or turned over onto its other side, upon the flat grill. Alternatively, clam-shell apparatus or appliances have also been employed which can effectively cook or toast both sides of the food simultaneously as a result of the food being placed upon a lower food support cooking platform or grill when the clamshell apparatus is disposed at its open position, and then the clamshell apparatus is pivotally moved to its closed position so as to bring the upper food cooking grill portion into contact with the food. The operational drawback or disadvantage of such apparatus, equipment, or appliances, however, is the fact that the cooking time is effectively monitored and necessarily controlled by means of the personnel doing the grilling or cooking, with the result that sometimes, the food is undercooked, overcooked, or even burned, neither one of which operations and resulting conditions produces a satisfactory and tasty end food product. In addition, it is also sometimes desired to simultaneously prepare or cook or re-thermalize different types of food which may require different cooking temperatures and different cooking times.

A need therefore exists in the art for a new and improved grilling appliance for cooking or re-thermalizing food wherein the aforenoted disadvantages or operational drawbacks characteristic of conventional cooking apparatus, equipment, or appliances are effectively overcome or eliminated. More particularly, a need exists in the art for a new and improved grilling appliance wherein the cooking process or procedure is effectively controlled in such a manner that the food being cooked or prepared or re-thermalized cannot be undercooked, overcooked, or burned. Still more particularly, a need exists in the art for a new and improved grilling appliance wherein the entire cooking procedure or process is automatically controlled from the beginning of the cooking cycle to the end of the cooking cycle and is predeterminedly controlled in light of the particular food product that is being cooked. Yet further, a need exists in the art for a new and improved grilling appliance wherein multiple independently controlled conveyors, defining multiple independently controlled cooking lanes, are required in order to meet the need for simultaneously preparing or cooking different types of foods.

Overall Objectives of the Invention

The overall objectives of the present invention are to provide a new and improved grilling appliance for cooking food which will overcome and eliminate the various disadvantages and drawbacks characteristic of conventional grilling apparatus, equipment, or appliances for cooking food, to provide a new and improved grilling appliance for cooking food which will effectively overcome and eliminate the poor cooking results often encountered with conventional grilling appliances, apparatus, or equipment for cooking food, to provide a new and improved grilling appliance which will enhance the efficiency of the food-cooking procedure or process, and to provide a new and improved grilling appliance which will automatically controt the food-cooking procedure or process, from the beginning of the food-cooking cycle to the end of the food cooking cycle, so as to provide a properly cooked and tasty end food product, and to provide a new and improved grilling appliance which can simultaneously prepare or cook or re-thermalize different types of foods.

SUMMARY OF THE INVENTION

The foregoing and other objectives are achieved in accordance with the teachings and principles of the present invention through the provision of a new and improved grilling appliance for cooking food wherein the grilling appliance comprises upper and lower endless conveyor belts which are routed over and around upper and lower heated platens and which are fabricated, for example, from PTFE, polytetrafluoroethylene, which are adapted to be disposed in contact with the food articles being cooked, and yet the food articles will not adhere or stick to the conveyor belts. The conveyor belts are flow-through conveyor belts, that is, they extend from a first food-insert end of the appliance toward a second oppositely disposed food-output end of the appliance, and consequently, depending upon the speed of the conveyor belts, which can be optimally controlled, the time during which the food articles are exposed to the heated conveyor belts, which are heated by means of the heated platens, is predetermined such that the food articles are not in fact undercooked or overcooked but are properly cooked so as to result in a very satisfactorily cooked and tasty end food product. It is further noted that the disposition of the upper platen, around which the upper conveyor belt is routed, can be adjusted with respect to the lower platen and the lower conveyor belt so as to effectively adjust the gap defined between the upper and lower platens and the upper and lower conveyor belts. In this manner, the grilling appliance can accommodate different foods having different height dimensions such as, for example, burritos, Panini sandwiches, crunch wraps, and the like. Still further, the appliance provides for the easy removal of the conveyor belts for cleaning, maintenance, or exchange of the belts. Yet further, the grilling appliance of the present invention comprises multiple independently controlled sets of conveyors defining multiple independently controlled conveyor cooking lanes for simultaneously preparing or cooking different types of foods as a result of a single pass of the different types of foods through the grilling appliance housing.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 12 is a schematic view of a second embodiment of the new and improved grilling machine wherein two sets of operationally cooperative conveyors are disposed in a side-by-side arrangement with respect to each other, wherein each set of conveyors comprises an upper conveyor belt and a lower conveyor belt, and wherein each set of conveyors is independently controlled, with respect to its temperature and speed, such that different food articles, requiring different cooking parameters, can be simultaneously prepared as a result of a single conveyor pass through the appliance housing;

FIG. 13 is a schematic perspective view similar to that of FIG. 5 showing, however, the pair of lower endless conveyor belt assemblies, comprising the pair of lower heated platens and the tensioned front idler rollers, over and around which the pair of lower conveyor belts are conducted so as to be heated by means of the lower heated platens.

DETAILED DESCRIPTION OF THE ILLUSTRATED EMBODIMENTS

Figure 7:
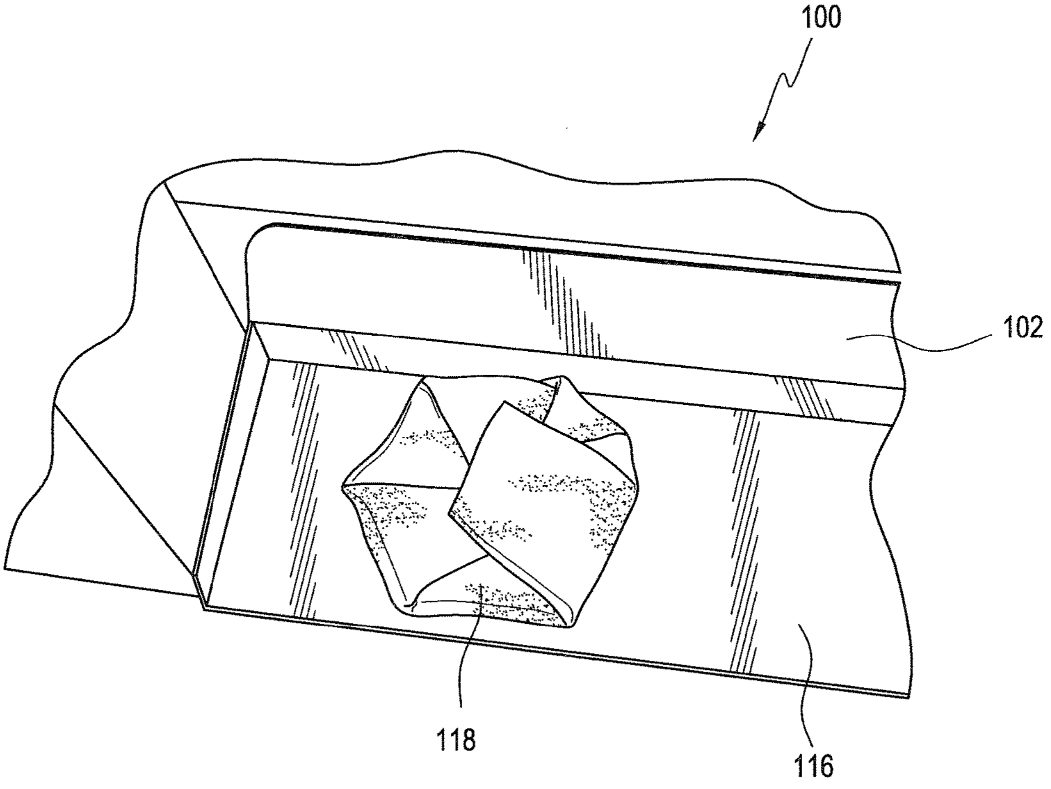
FIG. 7 is a perspective plan view showing the installation of a food holding tray which may be fixedly secured upon the exit end of the grilling machine so as to effectively catch and hold the food products which have been cooked and which have been discharged from the grilling machine by means of the lower endless conveyor belt.
Figure 9B:
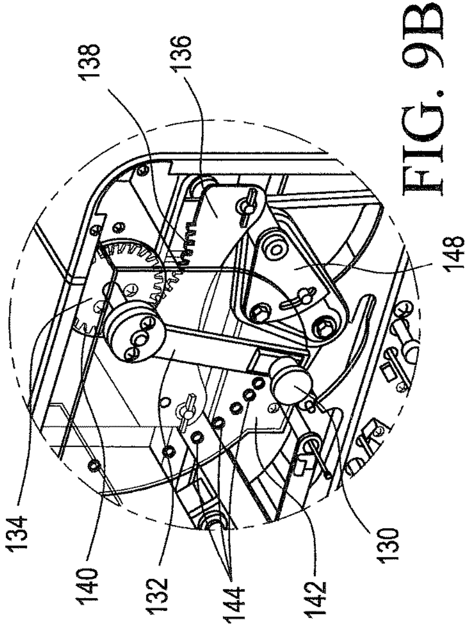
FIG. 9B an enlarged view of the circled area denoted B illustrated in FIG. 9 showing the details of the rack and pinion drive mechanism, the pilot pin locator plate having a multitude of pilot pin locator holes defined therein, and the pilot pin located upon the distal end of a pivotally or arcuately movable arm fixedly connected to the pinion of the rack and pinion drive mechanism, whereby the upper conveyor belt and its operatively associated heated platen are disposed at their highest position relative to the lower conveyor belt and its operatively associated heated platen.
Figure 9:
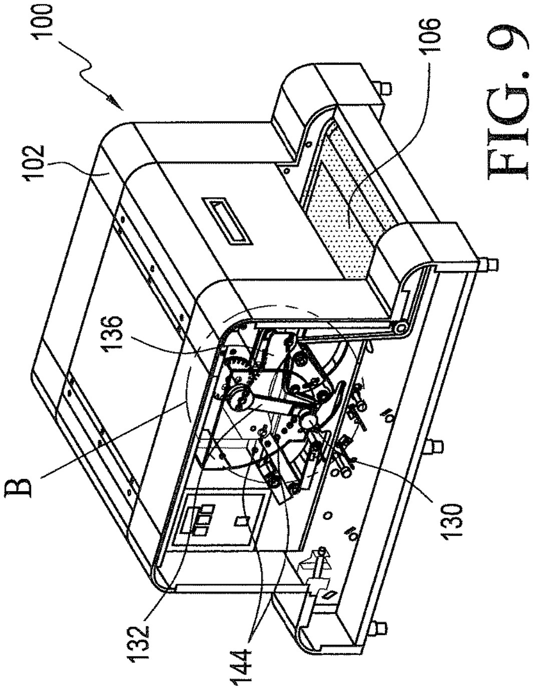
FIG. 9 is a schematic front-side perspective view of the grilling appliance, similar to that of FIG. 8, showing, however, the internal components, comprising the rack and pinion drive mechanism, of the grilling compliance, which permits the upper endless conveyor belt and its operatively associated heated platen to have its elevational position, relative to the lower endless conveyor belt and its operatively associated heated platen, to be vertically adjusted so as to permit the grilling appliance to be utilized to cook different foods have different height or thickness dimensions, and wherein a circle area B is noted.
Figure 8A:
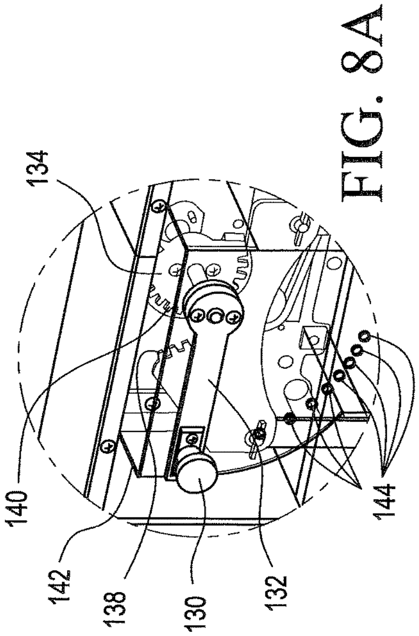
FIG. 8A is an enlarged view of the circled area denoted A illustrated in FIG. 10 illustrating the details of the rack and pinion drive mechanism, the pilot pin locator plate having a multitude of pilot pin locator holes defined therein, and the pilot pin located upon the distal end of a pivotally or arcuately movable arm fixedly connected to the pinion of the rack and pinion drive mechanism, whereby the upper conveyor belt and its operatively associated heated platen are disposed at their lowest position relative to the lower conveyor belt and its operatively associated heated platen.
Figure 8:
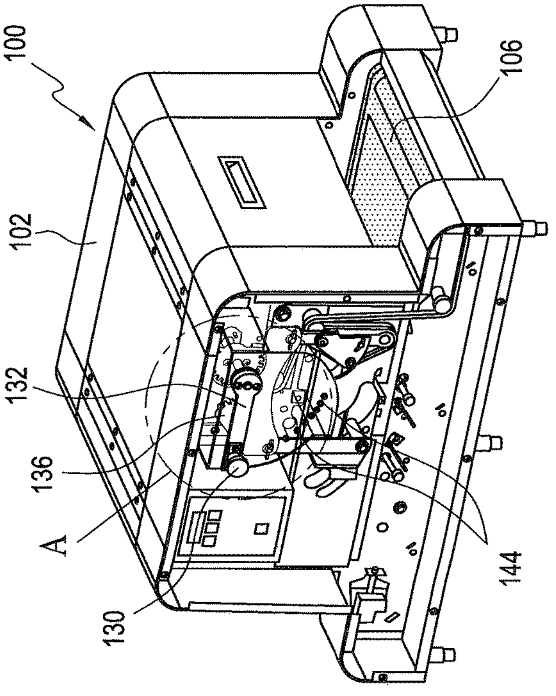
FIG. 8 is a schematic front-side perspective view of the grilling appliance showing the internal components, comprising a rack and pinion drive mechanism, of the grilling compliance, which permits the upper endless conveyor belt and its operatively associated heated platen to have its elevational position, relative to the lower endless conveyor belt and its operatively associated heated platen, to be vertically adjusted so as to permit the grilling appliance to be utilized to cook different foods have different height or thickness dimensions, and wherein a circle area A is noted.

Referring now to the drawings, and more particularly to FIGS. 1-5 thereof, a first embodiment of a new and improved conveyor-type grilling appliance for cooking food is disclosed and is generally indicated by the reference character 100. More particularly, it is seen that the new and improved conveyor-type grilling appliance 100 comprises a housing 102 within which a pair upper and lower conveyor belts 104, 106 are disposed as can best be appreciated from FIGS. 1,3, and 4. The upper and lower conveyor belts 104,106 are endless conveyor belts that flow through the housing 102 from a food product input or entrance end 108 of the housing 102 to a food product output or exit/discharge end 110 of the housing 102. The upper conveyor belt 104 is wholly enclosed within the housing 102, while the opposite ends of the lower conveyor belt 106 extend beyond each end of the housing 102. In this manner, a first movable platform region 112 of the lower conveyor belt 106 is defined at the food product input or entrance end 108 of the housing 102 for permitting food-cooking personnel to effectively place the food, to be cooked, onto the input platform region 112 of the lower conveyor belt 106 whereby the lower conveyor belt 106 will then move the food, to be cooked, into the appliance 100. Once the food, to be cooked, is inside the appliance 100, the food, to be cooked, will effectively be captured between the upper and lower conveyor belts 104, 106 and will be propel-led forwardly by the upper and lower conveyor belts 104,106 until the food exits from the oppositely disposed exit or discharge end 110 of the appliance housing 102. The oppositely disposed exit or discharge end 110 of the lower conveyor belt 106, disposed at the exit or discharge region of the appliance 100, effectively forms a second movable platform region 114 from which food cooking personnel can remove the cooked food. Alternatively, as disclosed within FIG. 7, a suitable tray 116 can be fixedly attached to the housing 102 at the exit or discharge end 110 of the appliance 100 for effectively catching and holding the cooked food 118 as the cooked food is discharged and deposited into the tray 116 by means of the movable lower conveyor belt 106.

Figure 1:
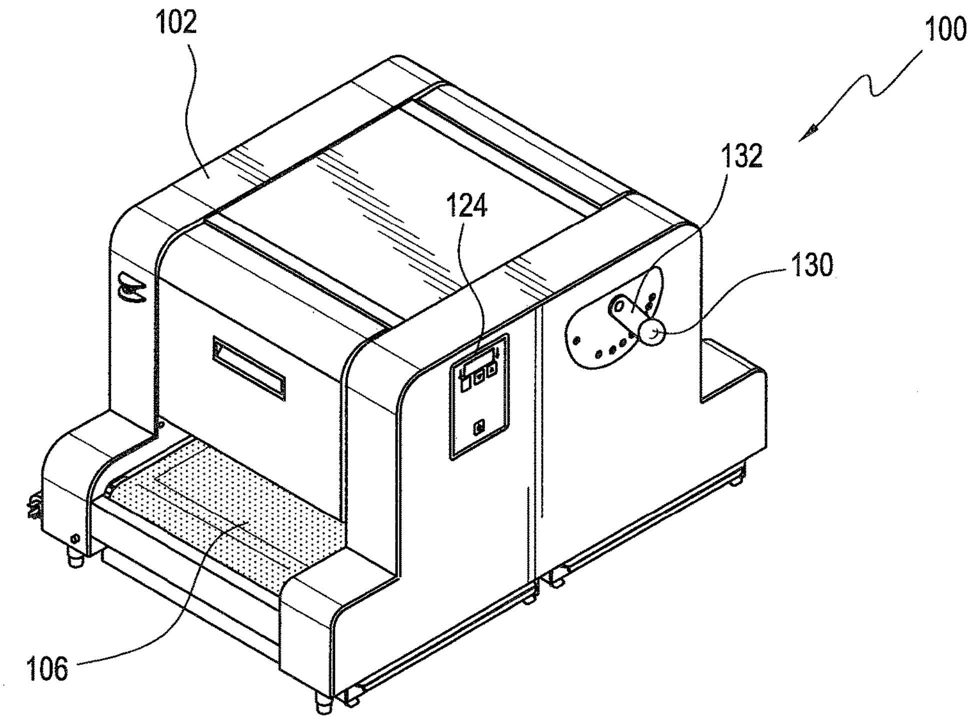
FIG. 1 is a schematic front-side perspective view of a first embodiment of the new and improved conveyor type grilling machine as constructed in accordance with the teachings and principles of the present invention and showing the various component parts thereof.
Figure 2:
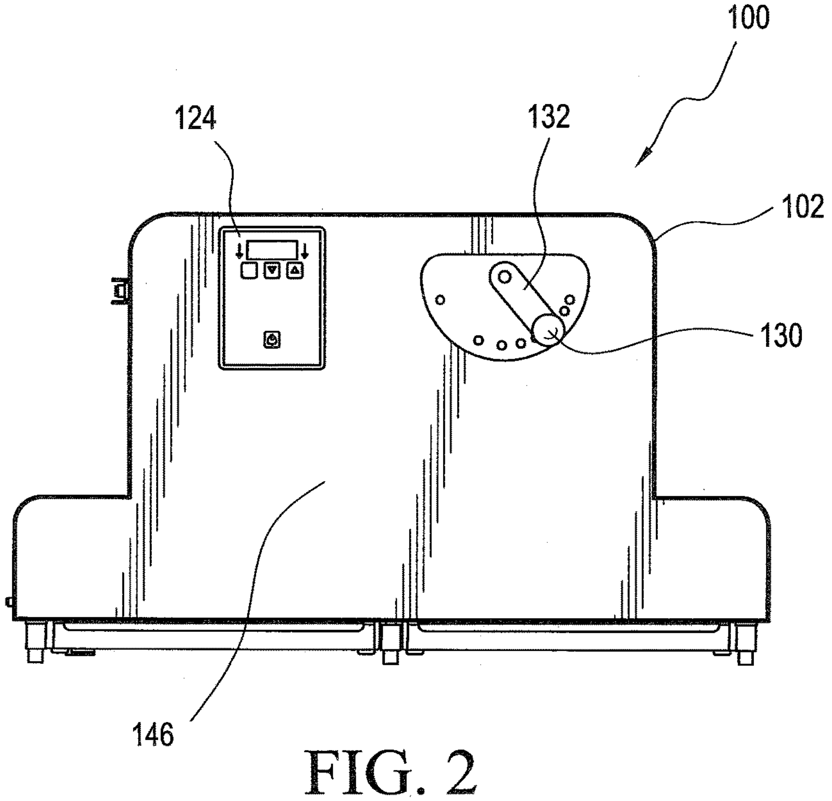
FIG. 2 is a schematic side elevational view of the new and improved conveyor type grilling machine as illustrated within FIG. 1.
Figure 3:
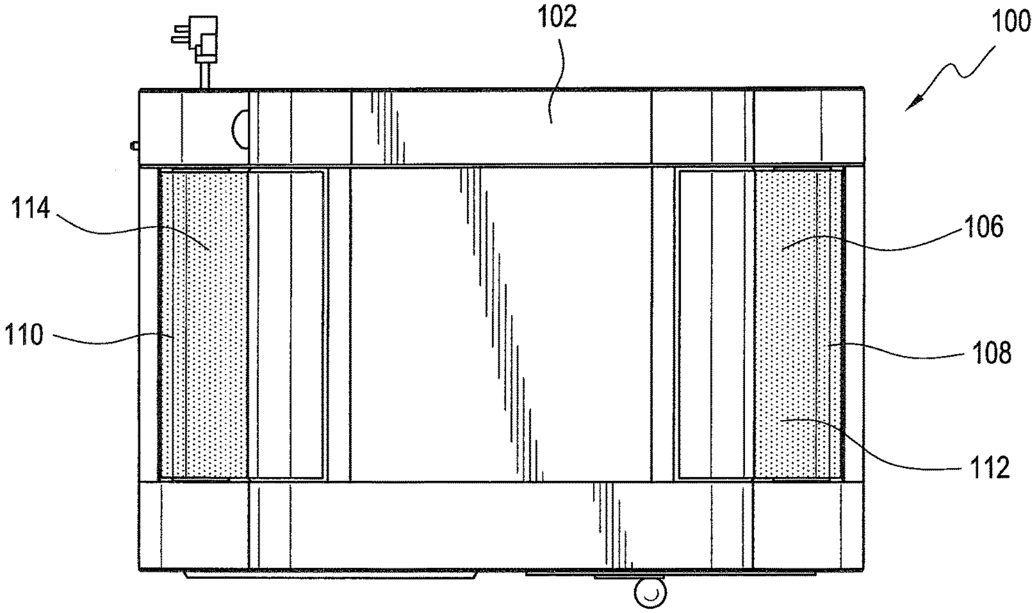
FIG. 3 is a top plan view of the new and improved conveyor-type grilling machine as illustrated within FIGS. 1 and 2.
Figure 4:
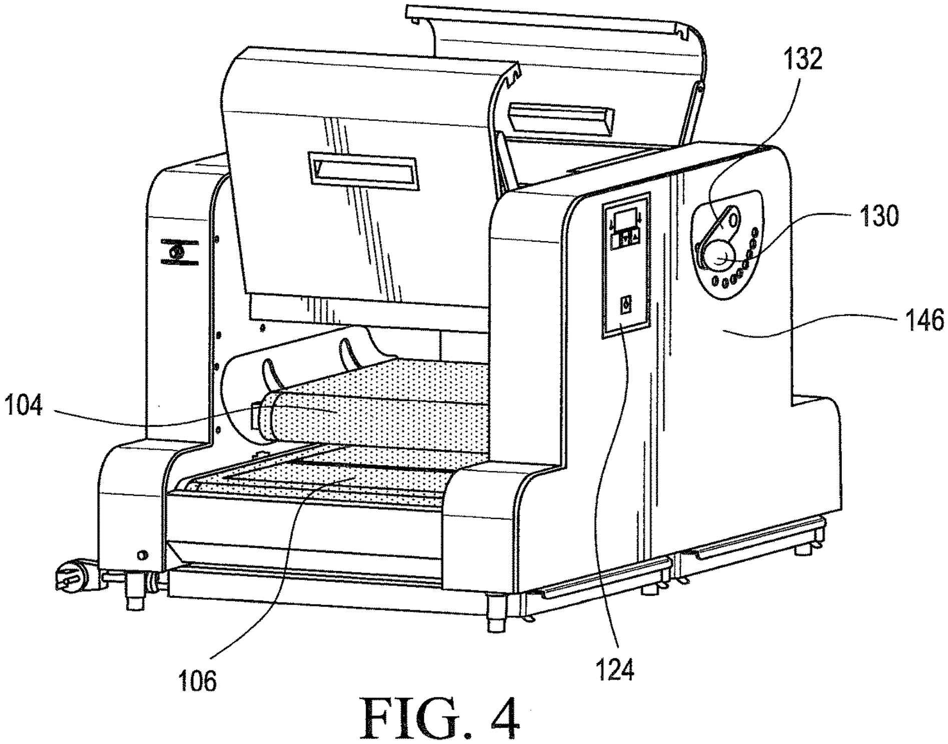
FIG. 4 is a schematic front-side perspective view of the new and improved conveyor type grilling machine, similar to that of FIG. 1, showing, however, the entry end and exit end doors of the grilling machine in their opened positions so as to facilitate, for example, maintenance, cleaning, and conveyor belt exchange operations which may need to be performed upon the appliance at predetermined times.
Figure 5:
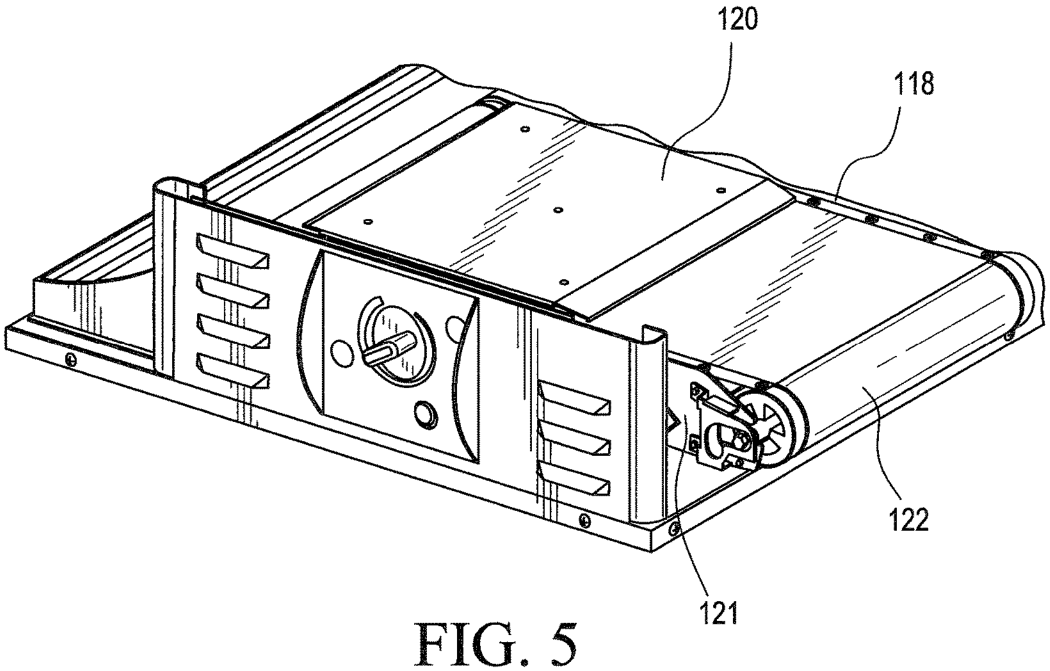
FIG. 5 is a partial perspective view of the new and improved conveyor type grilling machine as illustrated within FIGS. 1-4 showing the provision of, for example, a portion of the lower endless conveyor belt assembly, comprising the lower heated platen and the tensioned idler roller, over and around which the lower conveyor belt is conducted so as to be heated by means of the lower heated platen.

With reference being made to FIG. 5, there is disclosed a partial perspective view of, for example, a portion of the lower endless conveyor belt support and drive assembly 118 which is seen to comprise, for example, a lower heated platen 120 fixedly mounted upon a platen platform 121 and a tensioned front idler roller 122 over and around which the lower endless conveyor belt 106, not shown, is conducted so as to be heated by means of the lower heated platen 120. A rear drive roller, not shown, is also provided, and both the upper and lower endless conveyor belts 104,106 are fabricated, for example, from polytetrafluoroethylene (PTFE) such that the upper and lower endless conveyor belts 104, 106, which are adapted to be disposed in contact with the food articles being cooked as a result of the upper and lower endless conveyor belts 104,106 propelling the food to be cooked through the appliance 100 from the food input or entrance end 108 of the housing 102 to the food output or exit/discharge end 110 of the housing 102, will effectively prevent the food products being cooked from adhering or sticking to the upper and lower endless conveyor belts 104,106. The drive system, not shown, for the rear drive roller can of course be any suitable conventional drive system, such as, for example, a suitable chain and sprocket drive assembly. It is to be further noted that a user interface or similar control panel 124 is provided upon a side wall portion of the housing 102, as can best be seen in FIGS. 1,2, and 4, in this manner, the temperature of both the upper and lower heated platens, exemplified by means of the lower heated platen 120, as well as the speed of the upper and lower endless conveyor belts 104,106, which are driven at the same synchronous speed, can be optimally controlled so as to in turn control the real time during which the food articles are exposed to the upper and lower endless conveyor belts 104,106 heated by means of the heated platens exemplified by means of the lower heated platen 120. In this manner, the actual or real cooking time is effectively predetermined such that the food articles are not in fact undercooked or overcooked but are properly cooked so as to result in a very satisfactorily cooked and tasty end food product.

Figure 6:
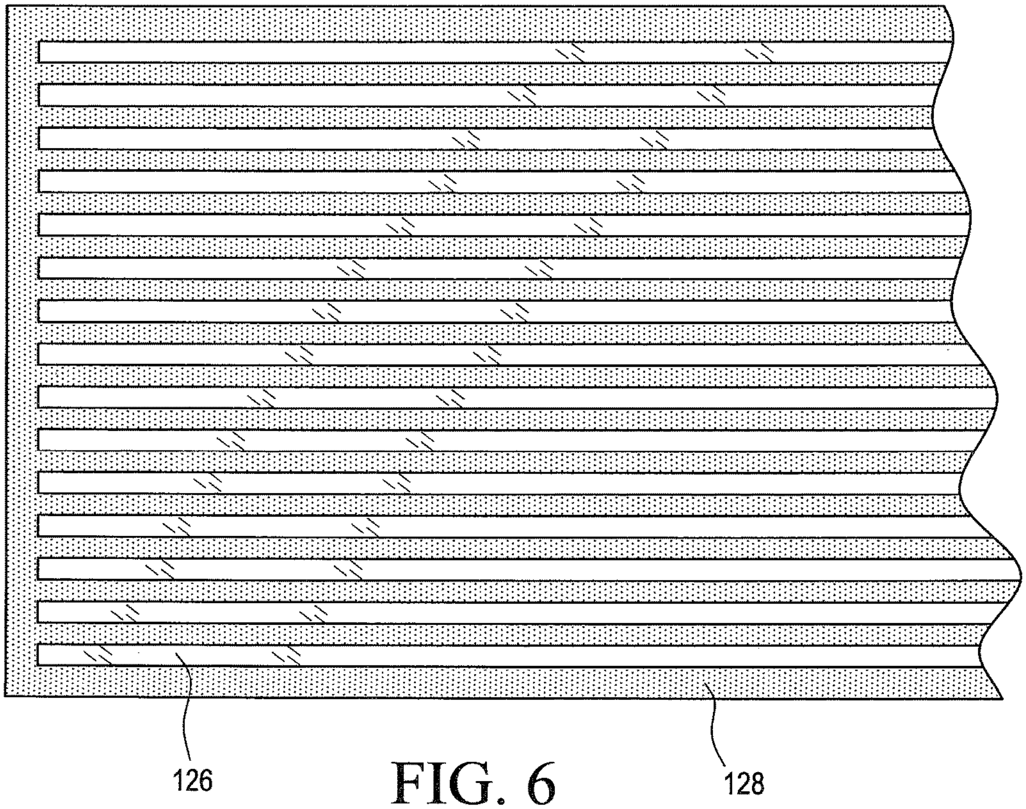
FIG. 6 is a plan view of an embodiment of a uniquely constructed endless conveyor belt, which may be used as an upper conveyor belt, a lower conveyor belt, or as both conveyor belts, whereby either one or both of the upper and/or lower surface portions of the cooked food product will effectively have grill lines formed thereon so as to simulate grill lines that would otherwise appear upon such food products if the food products were actually cooked, for example, upon a charcoal grill.

With reference being made to FIG. 6, there is disclosed a uniquely fabricated conveyor belt which may be used either as the upper endless conveyor belt 104, the endless lower conveyor belt 106, or as both the upper and lower endless conveyor belts 104,106. As has been noted, the endless conveyor belt 104 or 106 is fabricated from polytetrafluoroethylene (PTFE), however, in accordance with the unique fabrication techniques employed in fabricating the endless conveyor belt 104 or 106, it is seen that the endless conveyor belt 104 or 106 comprises a first base endless conveyor belt 104 or 106 fabricated from a first polytetrafluoroethylene (PTFE) component 126, upon top of which a second polytetrafluoroethylene (PTFE) component 128, comprising a plurality of transversely spaced strips, is fixedly secured. Accordingly, those regions of the composite endless conveyor belt 104 or 106, which have the transversely spaced strips defining the second polytetrafluoroethylene (PTFE) 128 fixedly secured thereon, will effectively have a larger thickness dimension than those regions of the composite endless conveyor belt 104 or 106 which do not have the transversely spaced strips defining the second polyte-trafluoroethylene (PTFE) 128 fixedly secured thereon. Accordingly, as the food articles are conveyed through the appliance housing 102 by means of the operatively cooperative upper and lower endless conveyor belts 104,106, the transversely spaced strips comprising the second polytetrafluoroethylene (PTFE) 128 will effectively be forced into contact with the external surface portions of the food articles being conveyed through the appliance 102, to a greater degree than that of the base endless conveyor belt portion 126, so as to effectively form visual stripes upon the external surface portions of the food articles which simulate grill marks or lines that would appear upon the food articles as if the food articles had actually been cooked or prepared upon, for example, a charcoal grill.

It is lastly noted that the disposition of the upper platen, around which the upper conveyor belt is routed, can be adjusted with respect to the lower platen and the lower conveyor belt so as to effectively adjust the gap defined between the upper and lower platens and the upper and lower endless conveyor belts. In this manner, the grilling appliance can accommodate different foods having different height or thickness dimensions such as, for example, burritos, Panini sandwiches, crunch wraps, and the like. Still further, the appliance provides for the easy removal of the upper and lower endless conveyor belts 104,106 for cleaning, maintenance, or exchange of the conveyor belts 104,106 as may be needed or required. With reference therefore being made to FIGS. 8,8A,9, and 9B, the vertical adjustment of the upper heated platen and the upper endless conveyor belt 104 that is disposed therearound, with respect to the lower heated platen and the lower endless conveyor belt 106 disposed therearound, will be discussed first. It is to be noted that while the vertical adjustment of the upper heated platen and the upper endless conveyor belt 104, with respect to the lower heated platen and the lower endless conveyor belt 106 can be achieved by various means, including the use of, for example, hydraulic, pneumatic, or electrical actuators, a manual adjustment system has been incorporated within the conveyor-type grilling appliance 100 of the present invention. As disclosed within FIGS. 8,8A,9, and 9B, both sides of the convey-ortype grilling appliance housing 102 are provided with a manual adjustment pilot pin 130 which is fixedly secured to a first distal end of a pilot pin mounting arm 132, while the second opposite proximal end of the pilot pin mounting arm 132 is fixedly connected to the axial center of a circular disk-type pinion 134, it being noted that only one adjustment system comprising one pilot pin 130, one pilot pin mounting arm 132, and one circular disk-type pinion 134 is illustrated in these side perspective views. These components can likewise be seen in FIGS. 1,2, and 4, it being noted that the side wall of the appliance housing 102 is to be considered transparent for visual purposes of this disclosure so as to effectively see, for example, the mounting arm 132 which is disposed internally of the appliance housing 102.

In addition to the aforenoted components, a rack 136, having gear teeth 138 formed upon an upper arcuate edge portion thereof, is provided for engagement with gear teeth 140 formed upon the outer circumferential peripheral surface of the pinion 134, the rack 136 and pinion 134 assembly being biased toward their uppermost position by spring-biasing means, not shown. Still further, a pilot pin locator plate 142 is provided with a multitude of pilot pin locator holes 144 which are defined within an arcuate array covering an angular extent of approximately 45° extending from a leftmost or western position upon the pilot pin locator plate 142 to a lowermost or southern position upon the pilot pin locator plate 142. The pilot pin 130 is a spring-biased pull-pin that is capable of being moved in a direction along the axis around which the pilot pin 130 is defined. The pilot pin 130 is thus pulled axially outwardly so as to effectively be disengaged from one of the pilot pin locator holes 144 defined within the pilot pin locator plate 142 whereby the pilot pin 130 can then be moved toward another pilot pin locator hole 144 defined within the pilot pin locator plate 142, and is permitted to be moved axially inwardly under the biasing force of its biasing spring, not shown, so as to permit the locking pin 130 to be inserted into another or different pilot pin locator hole 144 in order to effectively lock the upper heated platen and the upper endless conveyor belt 104 at a particular vertical position with respect to the lower heated platen and the lower endless conveyor belt 106 when the vertical adjustment of the upper heated platen and the upper endless conveyor belt 104 relative to the lower heated platen and the lower endless conveyor belt 106 is to be achieved.

Each pilot locator hole 144 permits the upper heated platen and the upper endless conveyor belt 104 to be moved one quarter of an inch (0.25"), vertically upwardly or vertically downwardly, with respect to the lower heated platen and the lower endless conveyor belt 106. As disclosed within FIGS. 8 and 8A, it is seen that the upper heated platen and the upper endless conveyor belt 104 are disposed at their lowermost position with respect to the lower heated platen and the lower endless conveyor belt 106 as a result of the pilot pin mounting arm 132 extending horizontally to the left and the pilot pin 130 being disposed within the uppermost and leftmost pilot pin locator hole 144 of the arcuate array of pilot pin locator holes 144 defined within the pilot pin locator plate 142, whereas, as disclosed within FIGS. 9 and 9B, it is seen that the upper heated platen and the upper endless conveyor belt 104 are disposed at their uppermost position with respect to the lower heated platen and the lower endless conveyor belt 106 as a result of the pilot pin mounting arm 132 extending substantially vertically downwardly whereby the pilot pin 130 is disposed within the lowermost or southernmost pilot pin locator hole 144 of the arcuate array of pilot pin locator holes 144 defined within the pilot pin locator plate 142. It is to be lastly noted that an arcuate slot, not shown, must be provided within a portion of each external side wall 146 of the housing 102 so as to permit the pilot pin 130 to project through the side wall 146 of the housing 102 and yet travel or be moved through its arcuate path when the pilot pin 130 is being moved from one pilot pin locator hole 144 to another pilot pin locator hole 144 in order to vertically adjust the disposition of the upper heated platen and the upper endless conveyor belt 104 with respect to the lower heated platen and the lower endless conveyor belt 106. In addition, a linkage plate 148, having a substantially triangular configuration, is connected at one corner thereof to the rack 136 while another corner thereof is operatively connected to the drive chain, not shown, which is operatively associated with the upper conveyor belt drive roller. The linkage plate 148 is seen to move, as can be appreciated with reference being made to FIGS. 8,9, and 9B, as the vertical adjustment of the upper heated platen and the upper endless conveyor belt 104, with respect to the lower heated platen and the lower endless conveyor belt 106, is achieved in order to effectively eliminate any slack in the drive chain operatively associated with the upper conveyor belt drive roller.

Figure 10:
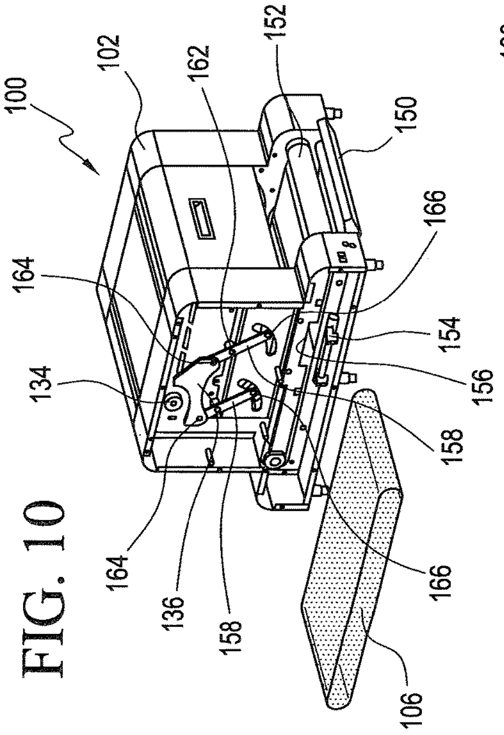
FIG. 10 is a schematic front-side perspective view of the grilling appliance with a side housing wall portion of the appliance illustrated as having been removed such that access can be gained to the internal components of the appliance in order to achieve a lower conveyor belt exchange operation.

Lastly in connection with this first embodiment of the present invention, and with reference being made to FIGS. 10 and 11A-11C, the removal of the upper and lower endless conveyor belts 104,106, for cleaning, maintenance, or exchange of the conveyor belts 104,106 as may be needed or required, will now be discussed. With reference first being made to FIG. 10, the removal and change of the lower conveyor belt 106 will be discussed first. In order to remove and exchange the lower conveyor belt 106, one of the external side walls 146 of the housing 102 is initially removed so as to provide access to the inner components of the appliance 100. A lower door 150 of the housing 102, operatively associated with and covering the lower conveyor belt idler roller 152, is then initially moved from its closed position to its opened position so as to in fact provide access to the lower conveyor belt idler roller 152. The lower conveyor belt idler roller 152, which may be similar to conveyor belt idler roller 122, is spring-biased by means of a suitable ten-sioning spring, not shown, whereby the lower conveyor belt 106 will remain proper-ly tensioned about the lower conveyor belt drive roller, not shown, and the lower conveyor belt idler roller 152. In addition, an idler roller lock mechanism 154, which is mounted upon an interior side wall portion of the appliance 100, is pivotally mov-ed from its upper position, at which it is effectively disposed within a slot 156 which can best be seen in FIG. 10, to a pivotally lower position at which the idler roller lock mechanism 154 is removed from the slot 156. Accordingly, the lower con-veyor belt idler roller 152 may now be moved inwardly toward the internal part of the hous-ing 102 and against the biasing force of its biasing spring, not shown, in view of the fact that the idler roller lock mechanism 154 has effectively been moved from a po-sition at which it blocks the internal movement of the lower conveyor belt idler roller 152 to a position at which it no longer blocks the internal movement of the lower conveyor belt idler roller 152. Therefore, the tension imposed upon the lower con-veyor belt 106 by means of the spring-biased lower conveyor belt idler roller 152 has effectively been relieved, whereby the lower con-veyor belt 106 can then be re-moved from its disposition overlying the lower conveyor belt drive and idler rollers as well as the lower heated platen.

Figure 11A:
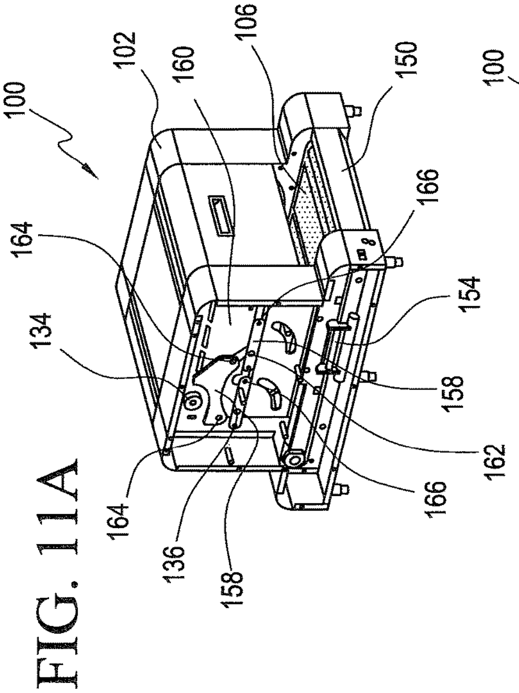
FIG. 11A is a schematic front-side perspective view of the grilling appliance with a side housing wall portion of the appliance illustrated as having been removed such that access can be gained to the internal components of the appliance in order to achieve an upper conveyor belt exchange operation.
Figure 11B:
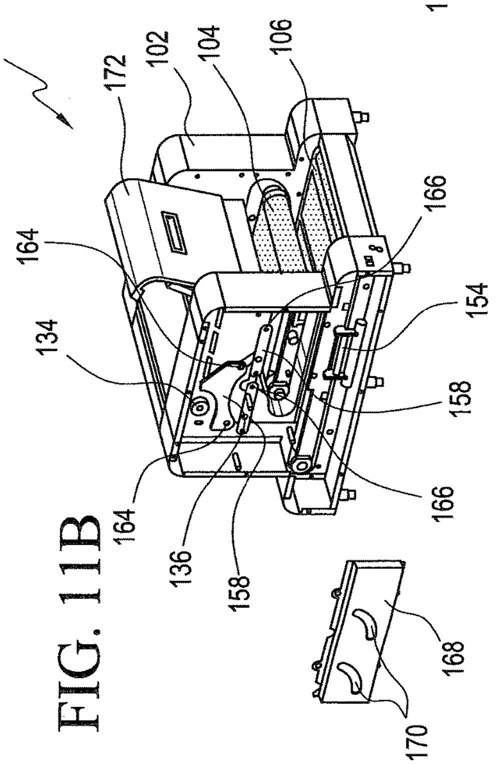
FIG. 11B is a schematic front-side perspective view of the grilling appliance, similar to that of FIG. 11A, wherein the side housing wall portion of the appliance illustrated has been removed such that access can be gained to the internal components of the appliance in order to achieve an upper conveyor belt exchange operation, and wherein the front access door has been moved to its open position, and the pair of pivot links, connecting the rack of the height adjustment mechanism for the upper conveyor belt to the upper conveyor belt mounting system, have been moved to their out-of-the way position so as to permit removal of the upper conveyor belt side cover so as to, in turn, permit access to and removal of the upper conveyor belt.
Figure 11C:
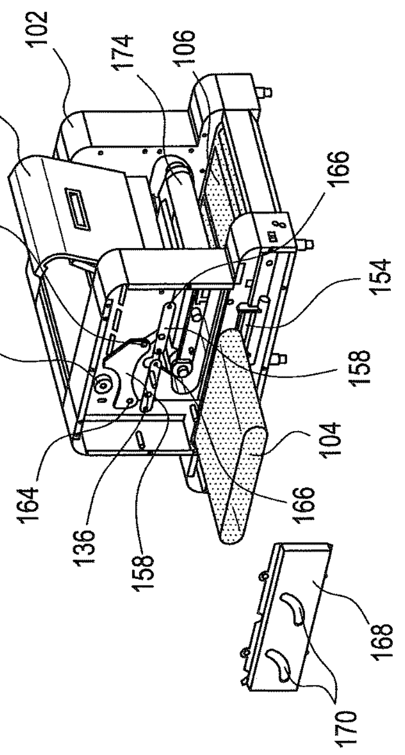
FIG. 11C is a schematic front-side perspective view of the grilling appliance, similar to that of FIGS. 11A and 11B, wherein, as a result of the removal of the upper conveyor belt side cover, the upper conveyor belt can in fact be removed.

With reference lastly being made to FIGS. 11A-11C, the removal and exchange of the upper conveyor belt 104 will now be discussed. Once again, one of the side walls 146 of the appliance is initially removed so as to permit personnel to gain access to the interior components of the appliance. The rack and pinion assemblies 136,134 have been moved to and locked at their uppermost positions. It is seen that each one of the rack and pinion assemblies 136,134 are operatively connected to each side of the upper conveyor belt heated platen platform, which may be similar to the heated platen platform 121, by means of two linkage mem-bers 158,158 which can best be seen in FIG. 10. Each side set of linkage members 158,158 is pivotally attached or mounted at relatively central portions thereof to an interior sidewall portion 160 of the appliance 100 as at 162. Upper end portions of the linkage members 158,158 are pivotally connected to the rack 134 by means of a first set of pull-pins 164,164 which can best be seen in FIG. 10, while lower end portions of the linkage members 158,158 are pivotally connected to the upper heated platen platform, not shown, by means of a second set of pull-pins 166,166, as can also best be seen in FIG. 10. Accordingly, the next step in the procedure to be conducted in connection with the removal and exchange of the upper conveyor belt 104 is the removal of the first and second sets of pull-pins 164, 166 so as to permit the opposite end portions of the linkage members 158,158 to be disconnected from the rack 134 and the upper heated platen platform, not illustrated. The linkage members 158,158 can then be moved to horizontally oriented positions, as shown in FIG. 11A, at which positions the linkage members 158, 158 no longer overlie an upper conveyor belt side cover panel 168.

Accordingly, the upper conveyor belt side cover panel 168 can now be removed from the interior side wall portion 160 of the appliance as shown in FIG. 11B after suitable fasteners, not shown, are removed which have effectively connected the upper conveyor belt side cover panel 168 to the interior side wall portion 160 of the appliance 100. As can also best be seen in FIG. 11B, the upper conveyor belt side cover panel 168 has a pair of arcuate slots 170,170 formed therein for permitting the second set of pull pins 166,166, attached to the lower end portions of the linkage members 158,158, to traverse such slots 170,170 as the rack and pinion assembly 136,134 serves to alter or adjust the vertical disposition of the upper heated platen and the upper conveyor belt 104 relative to the lower heated platen and the lower conveyor belt 106. Once the foregoing procedures have been accomplished, the front or rear access door 172 of the appliance, which is pivotally connected to and operatively associated with that end of the appliance 100 at which the upper conveyor belt idler roller 174, as shown in FIG. 11C, is positioned, is moved to and locked at its opened position. Access is now gained with respect to the upper conveyor belt 104 and its idler roller 174. As was the case with the removal or exchange operation previously noted in connection with the lower conveyor belt 106, the upper conveyor belt idler roller 174 may now be moved inwardly toward the internal part of the housing 102 and against the biasing force of its biasing spring, not shown. Therefore, the tension imposed upon the upper conveyor belt 104 by means of the spring-biased up-per conveyor belt idler roller 174 has effectively been relieved, whereby the upper conveyor belt 104 can then be removed from its disposition overlying the upper conveyor belt drive and idler rollers as well as the upper heated platen.

With reference now being made to FIGS. 12 and 13, a second embodiment of a new and improved conveyor-type grilling appliance for cooking food is disclosed and is generally indicated by the reference character 200. It is to be noted that components parts of this second embodiment of the conveyor-type grilling appliance 200 which correspond to component parts of the first embodiment of the grilling appliance will be provided with corresponding reference numbers except that they will be within the 200 series. More particularly, it can be seen that the second embodiment of the new and improved conveyor-type grilling appliance comprises a housing 202 within which two sets of flow-through conveyor assemblies, comprising a first flow-through endless conveyor belt assembly 276, and a second flow-through endless conveyor belt assembly 278, are disposed in a side-by-side arrangement within the appliance housing 202. As was the case with the first embodiment grilling appliance 100, the first and second flow-through conveyor assemblies 276,278 are seen to respectively comprise a first lower front tensioned conveyor belt idler roller 222-1 and a second lower front tensioned conveyor belt idler roller 222-2 which are respectively mounted upon the front end portions of a first heated platen platform 221-1 and a second heated platform 221-2 and around which the pair of lower endless conveyor belts, not shown in the drawing but similar to lower endless conveyor belt 106, are adapted to be routed so as to be heated by means of the first and second lower heated platens 220-1,220-2. A corresponding pair of side-by-side upper endless conveyor belts, not shown in this drawing but similar to upper conveyor belt 104, are adapted to be operationally disposed for respective use in conjunction with the lower endless conveyor belts, also not shown, and are also operationally associated with upper heated platens, not shown, and conveyor belt drive systems which would include upper front tensioned conveyor belt idler rollers, not shown.

A suitable first user control interface 224-1 is provided upon a first side wall portion of the appliance housing 202 for controlling the temperature of the first lower heated platen 220-1, as well as the temperature of the first upper heated platen, not shown, the speed of the upper and lower endless conveyor belts, not shown, and the adjustable distance defined between the first upper and lower endless conveyor belts, not shown, and a second user control interface 224-2 is provided upon a second opposite side wall portion of the appliance housing 202 for likewise controlling the temperature of the second lower heated platen 220-2, as well as the temperature of the second upper heated platen, not shown, the speed of the upper and lower endless conveyor belts, not shown, as well as the adjustable distance defined between the first upper and lower endless conveyor belts, also not shown. As was discussed in connection with the first embodiment of the grilling appliance 100, the distance defined between the upper and lower endless conveyor belts can be adjusted by various means including hydraulic actuators, pneumatic actuators, electrical servomotors, or mechanical rack and pinion systems. It is further noted that as a result of the pro-vision of the upper and lower front tensioned conveyor belt idler rollers, the upper and lower endless conveyor belts can also be exchanged in a manner that has previously been disclosed in connection with the first embodiment grilling appliance. It can therefore be appreciated further that by providing the first and second endless flow-through conveyor assemblies 276,278 comprising the first and second sets of upper and lower endless conveyor belts, not shown, wherein each one of the first and second sets of the upper and lower heated platens can have their operational temperatures independently controlled, wherein the corresponding or synchronous speed of each one of the first and second set of upper and lower endless conveyor belts can be independently controlled, and wherein the distance defined between the upper and lower endless conveyor belts of each one of the first and second sets of the endless conveyor belts can be independently adjusted, the new and improved second embodiment cooking appliance can accommodate different foods having different height or thickness dimensions and can also be utilized to cook different foods requiring different cooking parameters because each one of the different types of foods can be inserted into and conveyed through the cooking appliance 200 along its own individual and separate or independent cooking lane as defined by means of one of the first and second sets of upper and lower endless conveyor belts.

Figure 14:
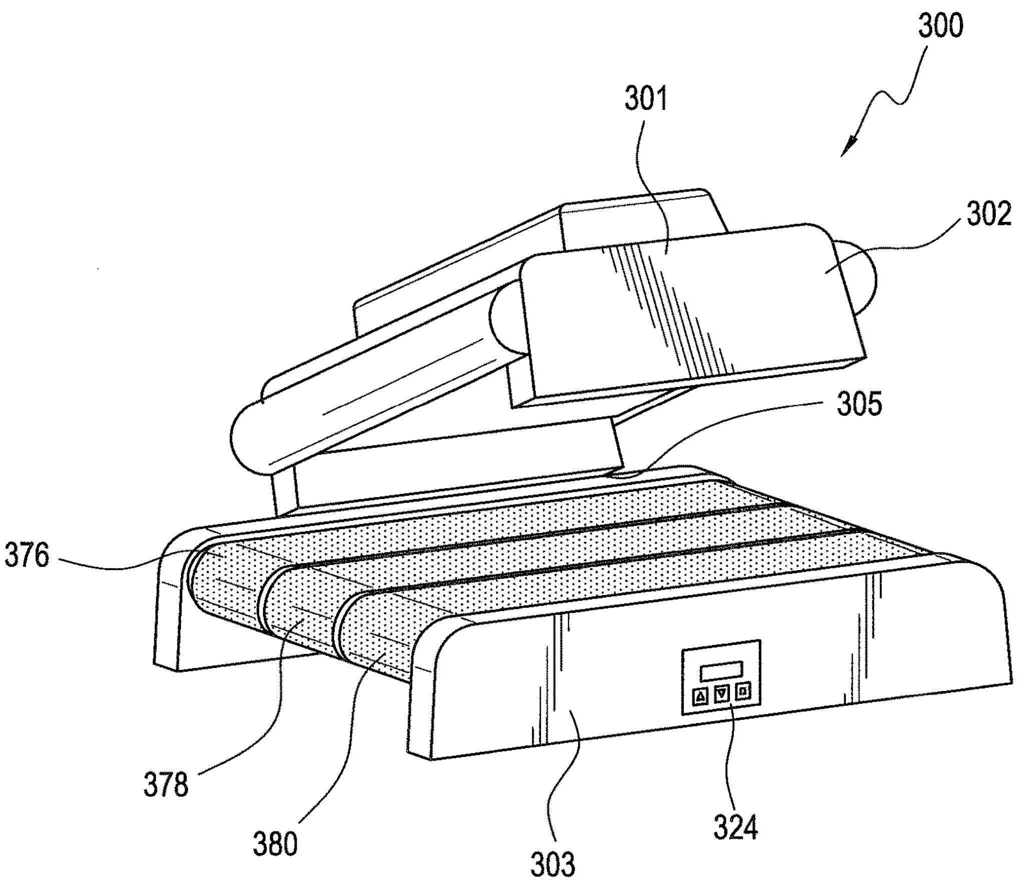
FIG. 14 is a schematic view of a third embodiment of the new and improved grilling machine wherein the appliance housing comprises a clam-shell type housing and wherein three sets of operationally cooperative conveyors are disposed in a side-by-side arrangement with respect to each other, wherein each set of conveyors also comprises an upper conveyor belt and a lower conveyor belt, and wherein each set of conveyors is independently controlled, with respect to its temperature and speed, such that different food articles, requiring different cooking parameters, can be simultaneously prepared as a result of a single conveyor pass of the food articles through the appliance housing.

With reference lastly being made to FIG. 14, a third embodiment of a new and improved conveyor-type grilling appliance for cooking food is disclosed and is generally indicated by the reference character 300. It is to be noted that components parts of this third embodiment of the conveyor-type grilling appliance 300 which correspond to component parts of the first and second embodiments of the grilling appliance will be provided with corresponding reference numbers except that they will be within the 300 series. More particularly, it can be seen that the third embodiment of the new and improved conveyor-type grilling appliance 300 comprises a housing 302 within which three sets of flow-through conveyor assemblies, comprising a first flow-through endless conveyor belt assembly 376, a second flow-through endless conveyor belt assembly 378, and a third flow-through endless conveyor belt assembly 380, are disposed in a side-by-side arrangement within the appliance housing 302. It is noted that the housing 302 is of the clam-shell type where the upper section 301 of the housing 302 is pivotally mounted upon one side of the lower section 303 of the housing 302 by suitable hinge structure 305 such that the upper section 301 of the housing 302 is pivotally movable between upper open and lower closed positions with respect to the lower housing section 303. As was the case with the first and second embodiments 100,200 of the grilling appliance of the present invention, it is to be appreciated that the three endless conveyor belt assemblies 376,378,380 are all similar to the endless conveyor belt assemblies disclosed within the first and second grilling appliance embodiments in that the endless conveyor belts of the three endless conveyor belt assemblies 376,378,380 will be operatively associated with heated platens and front tensioned idler rollers, not shown, such that the endless conveyor belts of the three endless conveyor belt assemblies 376,378,380 can be independently heated to predetermined temperature levels by their respective heated platens and can also be removed from cleaning, maintenance, or replacement as desired or required. In addition, a control interface 324 is provided upon a first side wall portion of the appliance housing 302 for controlling the temperature of the upper and lower heated platens operatively associated with the three endless conveyor belt assemblies 376,378,380, as well as the speed of the upper and lower endless conveyor belts of the three endless conveyor belt assemblies 376,378,380, and the adjustable distances defined between the upper and lower endless conveyor belts of the three endless conveyor belt assemblies 376,378,380.

As was discussed in connection with the first embodiment of the grilling appliance 100, the distance defined between the upper and lower endless conveyor belts can be adjusted by various means including hydraulic actuators, pneumatic actuators, electrical servomotors, or mechanical rack and pinion systems. It is further noted that as a result of the pro-vision of the upper and lower front tensioned conveyor belt idler rollers, the upper and lower endless conveyor belts can also be exchanged in a manner that has previously been disclosed in connection with the first embodiment grilling appliance. It can therefore be appreciated further that by providing the three endless conveyor belt assemblies 376, 378,380, wherein each one of three sets of the upper and lower heated platens can have their operational temperatures independently controlled, wherein the corresponding or synchronous speed of each one of the three endless conveyor belt assemblies 376, 378,380 can be independently controlled, and wherein the distance defined between the upper and lower endless conveyor belts of each one of the three endless conveyor belt assemblies 376,378,380 can be independently adjusted, the new and improved third embodiment cooking appliance can accommodate different foods having different height or thickness dimensions and can also be utilized to cook different foods requiring different cooking parameters because each one of the different types of foods can be inserted into and conveyed through the cooking appliance 300 along its own individual and separate or independent cooking lane as defined by means of one of the three endless conveyor belt assemblies 376, 378,380.

Obviously, many variations and modifications of the present invention are possible in light of the above teachings. It is therefore to be understood that within the scope of the appended claims, the present invention may be practiced otherwise than as specifically described herein.

KEY TO REFERENCE NUMBERS IN THE DRAWINGS

100—First embodiment conveyor type grilling appliance
102—Housing of 100
104—Upper endless conveyor belt
106—Lower endless conveyor belt
108—Food product input/entrance end of housing 102
110—Food product output or exit/discharge end of housing 102
112—First movable platform region of lower conveyor belt 106
114—Second movable platform region of lower conveyor belt 106
116—Food product discharge tray at food product discharge end of 102
118—Lower endless conveyor belt sup-port and drive assembly 118
120—Lower heated platen
121—Platen platform
122—Lower front tensioned conveyor belt idler roller
124—User interface/control panel upon side wall portion of housing 102
126—First base polytetrafluoroethylene (PTFE) component
128—Second polytetrafluoroethylene (PTFE) sealed atop 126
130—Adjustment pilot pin
132—Pilot pin mounting arm
134—Pinion of upper platen/conveyor belt adjustment system
136—Rack of upper platen/conveyor belt adjustment system
138—Gear teeth of rack 136
140—Gear teeth of pinion 134
142—Pilot pin locator plate
144—Pilot pin locator holes defined within pilot pin locator plate 142
146—Side wall of housing 102
148—Linkage plate
150—Lower door of housing 102
152—Lower front tensioned conveyor belt idler roller
154—Idler roller lock mechanism
156—Slot for accommodating idler roller lock mechanism in its up position
158—Linkage members connecting the rack/pinion to upper heated platen
160—Interior side wall of appliance 100
162—Pivotal attachment of linkages 158 to 160
164—First set of pull-pins connecting linkage members 158 to rack 136
166—Second set of pull-pins connecting linkage members 158 to upper platen
168—Upper conveyor belt side cover panel
170—Arcuate slots within side cover panel 168
172—Access door of appliance 100
174—Upper conveyor belt idler roller
200—Second embodiment conveyor type grilling appliance
202—Housing of second embodiment appliance
220-1—First lower heated platen
220-2—Second lower heated platen
221-1—First lower platen platform
221-2—Second lower platen platform
222-1—First lower front tensioned conveyor belt idler roller
222-2—Second lower front tensioned conveyor belt idler roller
224-1—First user interface for controlling temperature, gap and speed
224-2—Second interface for controlling temperature, gap, and speed
276—First flow-through endless conveyor belt assembly of appliance 200
278—Second flow-through endless conveyor belt assembly of appliance 200
300—Third embodiment conveyor type grilling appliance
301—Upper section of housing 302
302—Housing of third embodiment appliance
303—Lower section of housing 302
305—Hinge mechanism connecting housing sections 301, 303
324—User control interface for controlling temperature, gap, and speed
376—First flow-through endless conveyor belt assembly of appliance 300
378—Second flow-through endless conveyor belt assembly of appliance 300

What is claimed as new and desired to be protected by Letters Patent, is:

1. A conveyor-type grilling appliance for cooking or re-thermalizing food, comprising:
a housing;
a food insert entrance portion defined within a first end portion of said housing for inputting food, to be cooked, into said housing;
a food extraction exit portion defined within a second opposite end portion of said housing for extracting food, that has been cooked, out from said housing;
a plurality of endless conveyor belt sets disposed in a side-by-side arrangement within said housing, wherein each one of said plurality of endless conveyor belt sets defines a separate cooking lane for cooking food within said housing and comprises an upper endless conveyor belt and a lower endless conveyor belt cooperating with each other for propelling the food, to be cooked, from said food insert entrance portion of said housing to said food extraction exit portion of said housing; and
a heated platen respectively associated with each one of said upper and lower endless conveyor belts of each one of said plurality of endless conveyor belt sets for heating said upper and lower conveyor belts of said plurality of endless conveyor belt sets whereby said heated upper and lower conveyor belts cook the food within said housing while the food is transported through said housing from said food insert entrance portion of said housing to said food extraction exit portion of said housing.

2. The grilling appliance as set forth in claim 1, wherein:
said upper and lower endless conveyor belts, with each one of said plurality of endless conveyor belt sets, are respectively disposed around said heated platens, operatively associated with said upper and lower conveyor belts, such that said upper and lower conveyor belts are heated by said heated platens.

3. The grilling appliance as set forth in claim 1, wherein:
said plurality of endless conveyor belt sets disposed in a side-by-side arrangement within said housing comprises two sets of endless conveyor belts.

4. The grilling appliance as set forth in claim 1, wherein:
said plurality of endless conveyor belt sets disposed in a side-by-side arrangement within said housing comprises three sets of endless conveyor belts.

5. The grilling appliance as set forth in claim 1, wherein: said upper endless conveyor belt of each one of said plurality of endless conveyor belt sets is wholly disposed internally within said housing while opposite end portions of each one of said lower endless conveyor belts of said plurality of endless conveyor belt sets are disposed externally of said housing so as to define food insert and food output platforms upon which the food to be cooked, and the cooked food, are respectively disposed.

6. The grilling appliance as set forth in claim 1, wherein: each one of said plurality of endless conveyor belt sets, defining a separate cooking lane through said housing, has its speed independently controlled, and each one of said heated platens operatively associated with each one of said upper and lower conveyor belts defining each one of said plurality of endless conveyor belt sets, is independently controlled so as to cook different types of food as the different types of food are conveyed along a particular cooking lane defined within said housing.

7. The grilling appliance as set forth in claim 1, wherein: the speed of said upper and lower endless conveyor belts comprising a particular one of said plurality of sets of endless conveyor belts is the same so as to synchronously convey the food to be cooked through said appliance housing.

8. The grilling appliance as set forth in claim 1, wherein: the speed of said upper and lower endless conveyor belts of each one of said plurality of endless conveyor belt sets is adjustable so as to alter the time during which the food to be cooked is exposed to and heated by said upper and lower endless conveyor belts which are respectively heated by said pair of heated platens.

9. The grilling appliance as set forth in claim 1, wherein: said upper and lower endless conveyor belts, of each one of said plurality of endless conveyor belt sets, are fabricated from polytetrafluoroethylene so as to prevent the food to be cooked from sticking to said upper and lower endless conveyor belts.

10. The grilling appliance as set forth in claim 9, wherein: at least one of said upper and lower endless conveyor belts comprising said plurality of endless conveyor belt sets, fabricated from said polytetrafluoroethylene, comprises a composite fabric wherein first linear portions of said composite fabric, fabricated from polytetrafluoroethylene, are thicker than second linear portions of said composite fabric fabricated from polytetrafluoroethylene such that grill lines are effectively impressed upon the cooked food so as to simulate the food having been cooked upon a charcoal grill.

11. The grilling appliance as set forth in claim 10, wherein:
said at least one of said upper and lower endless conveyor belts, fabricated from said composite fabric, comprises both of said upper and lower endless conveyor belts.

12. The grilling appliance as set forth in claim 1, wherein: the temperature of each one of heated platens is adjustable.

13. The grilling appliance as set forth in claim 1, wherein: said upper endless conveyor belt and said upper heated platen of each one of said plurality of endless conveyor belt sets are disposed at a predetermined distance from said lower endless conveyor belt and said lower heated platen which is adjustable so as to permit different food, having different thickness dimensions, to be cooked within said housing of said grilling appliance.

14. The grilling appliance as set forth in claim 1, wherein: each one of said upper and lower heated platens of each one of said plurality of endless conveyor belt sets are respectively disposed upon upper and lower platen platforms; and
drive and idler rollers are disposed upon opposite ends of said upper and lower platen platforms so as to move each one of said upper and lower conveyor belts over and under said upper and lower heated platens so as to be heated thereby.

15. The grilling appliance as set forth in claim 1, wherein: each one of said upper and lower endless conveyor belts of each one of said plurality of endless conveyor belt sets is respectively removable from said upper and lower platen platforms.

16. The grilling appliance as set forth in claim 14, wherein:
said upper and lower idler rollers of each one of said plurality of endless conveyor belt sets are spring biased so as to properly tension said upper and lower endless conveyor belts disposed around said upper and lower drive and idler rollers, and said upper and lower heated platens.

17. The grilling appliance as set forth in claim 1, wherein: said housing is a clam-shell type housing wherein an upper section of said housing is pivotally connected to one side of a lower section of said housing so as to be pivotally movable between upper open and lower closed positions.

* * * * *